Patented Aug. 19, 1947

2,425,947

UNITED STATES PATENT OFFICE 2,425,947

METHOD OF PREPARING PECTIN

Herbert T. Leo and Clarence C. Taylor, Anaheim, Calif.

No Drawing. Application August 2, 1946, Serial No. 687,956

21 Claims. (Cl. 260—209.5)

This invention relates to a process of extracting pectin from pectous materials such as vegetables and fruits and parts of plants. The invention is particularly applicable to the extraction of pectin from citrus fruit materials such as limes, lemons and oranges.

A conventional method of isolating pectin from vegetable material, in particular, fruit material, includes an initial extraction of the pectin by means of an acid aqueous medium followed by a separation of the resulting extract from the residual fruit pulp. The separated extract usually contains upwards of 0.5% pectin, which is then isolated. The present invention is particularly concerned with this isolation of pectin from an acid extract of fruit material.

Pectin has heretofore been isolated from a pectous extract by addition to the extract of an alcohol, such as ethyl alcohol or isopropyl alcohol, whereby alcohol-water mixtures are formed in which pectin is insoluble. Such precipitation by means of alcohol, however, is not favored by those skilled in the art as much as another precipitation method involving the precipitation of aluminum hydroxide in the pectous extract. The precipitated aluminum hydroxide takes large amounts of pectin out of solution. The coprecipitate of aluminum hydroxide and pectin may be separated from the mother liquor in which it was formed and washed with acidified aqueous alcohol for the purpose of selectively removing the aluminum hydroxide. The pectin, being insoluble in aqueous alcohol, retains its solid form throughout the washing procedure and may subsequently be dried and ground, the dried and ground washed pectin representing the finished product.

In the separation of pectin from a pectous extract by means of aluminum hydroxide, the precipitation of aluminum hydroxide necessarily involves the incorporation with the extract of a soluble aluminum salt and of a basic reagent capable of reacting with the soluble aluminum salt to precipitate aluminum hydroxide. It should be noted, in this connection, that the pectous extracts prepared from fruit material in the course of the isolation of pectin from the fruit material are acid even when, for instance, a volatile acid reagent such as sulfur dioxide has been used to acidify the extraction medium and subsequently removed by volatilization from the extract prior to the precipitation of pectin and aluminum hydroxide, for pectin, in aqueous solution, has a natural pH value ranging from about 3.00 to about 4.00.

Pectin is known to be demethoxylated and even depolymerized by the action of added alkaline materials. This destructive action of alkaline materials occurs with extreme facility even at ordinary temperatures and may be completed within such a short time as five minutes. It should be understood that actually alkaline pH conditions are not required for demethoxylation with formation of what prior art workers have designated as "pectic acid," but that pH values as low as 5 to 6 suffice (U. S. patent to Baker et al., No. 2,233,574, page 2, column 1, lines 38 to 43). For this reason, persons skilled in the art have stated that "the risk of demethoxylation is so great that any contact of pectin with even weak alkali solutions (e. g., sodium bicarbonate) is to be avoided in technical practice" (C. L. Hilton, Fruit Pectins, Their Chemical Behaviour and Jellying Properties, Department of Scientific and Industrial Research, Food Investigation, Special Report No. 48, London, 1939, page 69).

Further, as pointed out by Hilton on page 53 of the above identified book, mere heating of pectin solutions greatly weakens the jellying power of the pectin, and the effects of heating "may be greater near the neutral point, and almost certainly would be so on the alkaline side."

Extraction of pectin from fruit material by means of acid aqueous media is conventionally carried out at an elevated temperature. For the reasons pointed out in the preceding paragraphs, it has heretofore been the invariable practice of those skilled in the art, when precipitating pectin from acid extracts of fruit material by means of aluminum hydroxide, to cool such extracts before carrying out the precipitation step. It has also been the invariable practice to add aluminum or other soluble aluminum salt to the pectin extract ahead of the alkali used to precipitate the aluminum hydroxide, for instance, soda ash or ammonia. Note the flowsheet appended to the amendment dated October 6, 1941, in the file of United States Patent No. 2,300,651 issued to Cole et al.

The above mentioned United States Patent No. 2,300,651 shows that the aluminum hydroxide-pectin coprecipitate prepared by the conventional addition of aluminum salt ahead of alkali at room temperature must be finely ground prior to washing with acidified alcohol. The coprecipitate of pectin and aluminum hydroxide may optionally be dried before being ground. This drying step entails, however, a loss of as much as 50 points or more in jelly grade.

The reason why the conventionally prepared coprecipitate of pectin and aluminum hydroxide must be ground finely (at least to 20 mesh, and not merely broken up) before being washed with acidified aqueous alcohol, apparently is the physical nature of the coprecipitate. The Cole et al. Patent No. 2,300,651 states that the coprecipitate is of a tough, rubbery, curd-like, gelatinous nature. Such a precipitate is not easily penetrated by the acidified aqueous alcohol, and must accordingly be ground finely if thorough washing is to be accomplished.

It should further be noted that the coprecipitate of pectin and aluminum hydroxide prepared by conventional methods is quite soft, and therefore unsuited for dewatering by means of pressing or other form of filtration prior to washing with acidified aqueous alcohol. As shown by the flowsheet attached to the amendment dated October 10, 1941, in the Cole et al. Patent No. 2,300,651, it has been customary to wash the coprecipitate with water prior to pressing the coprecipitate.

Aside from the above mentioned disadvantages of the conventional method of coprecipitating pectin and aluminum hydroxide, it should be noted that it has heretofore been necessary, in the case of each individual batch of pectin extract, to take samples of the batch and to determine how much soda ash and how much aluminum chloride are required for complete precipitation of the pectin. Such sampling and determination are explicitly taught by the patent to Cole et al., No. 2,300,651, which, however, does not disclose how such determination is to be carried out. It is not within the skill of the art to carry out such determinations.

We have now provided an improved method of isolating pectin from an acid extract of fruit material which method is devoid of the above mentioned disadvantages. This novel method proceeds contrary to the teaching of the prior art by effecting the coprecipitation of pectin and aluminum hydroxide at an elevated temperature and by establishing in one step of the process high pH values in the pectin extract ranging from 6.00 to 6.80. More particularly we incorporate with a hot pectin extract calcium carbonate in an amount sufficient to effect a pH value of from 6.00 to 6.80 (as measured after removal of liberated $CO_2$ to give the pH in the absence of the $CO_2$) and then add sufficient aluminum chloride to lower the pH value to between 3.70 and 4.50. The precipitation is carried out at a temperature at least equal to 120° F., and, when live steam is introduced into the extract to raise its temperature, preferably at a temperature of from 120° to 180°. If desired, the resulting coprecipitate may be boiled for short periods of time without damage.

In the above disclosed novel method of coprecipitating pectin and aluminum hydroxide, it is not necessary to take samples of the pectin extract and to determine, prior to the coprecipitation, how much aluminum chloride and soda ash are required for complete precipitation. The coprecipitate obtained by our novel method is not tough, rubbery or gelatinous, but is rather of a porous, firm, coarse, or more crystalline or fibrous nature. The coprecipitate does not require any washing prior to pressing, and may be dried without any loss of jelly strength. The coprecipitate may further be washed with acidified aqueous alcohol (with or without prior drying) without being ground. If desired, the coprecipitate may be pressed before being washed, and in that event it is sufficient to break up the press cakes before washing the same. No pressing is necessary, however, for the coprecipitate may be reeled or otherwise strained to remove the mother liquor in which it was formed and then immediately dropped into acidified aqueous alcohol for washing.

The pectin prepared by our novel method is characterized by high jelly grade (200 to 280 grade) and ability to form jellies at high temperatures ("quick setting"), in spite of the high temperatures and high pH conditions to which the pectin has been exposed in the course of its separation from the original pectin extract. Such high temperatures and pH values have heretofore been carefully avoided in the technical preparation of pectin, and, indeed, must be avoided if sodium, potassium, ammonium or like alkaline compounds are used to effect a coprecipitation of pectin and aluminum hydroxide. Our invention is based on the surprising discovery that calcium carbonate is not the equivalent of sodium, potassium, ammonium or like alkaline compounds as a precipitant of aluminum hydroxide in a pectin solution, but, if used for that purpose in place of sodium, potassium or ammonium compounds, is conducive to the elimination of the many disadvantages inherent in the use of the last mentioned compounds.

For the purpose of reducing and standardizing the amounts of aluminum chloride and of calcium carbonate required for complete precipitation of pectin, we prefer to wash the original fruit material thoroughly with water prior to the extraction of the fruit material with an acid aqueous medium. We have found that organic acids and salts naturally present in citrus fruit material (our preferred starting material) contain various amounts of organic acids and salts thereof, the amounts present always being sufficient to interfere with the coprecipitation of pectin and aluminum hydroxide. More particularly, the presence of these organic acids and salts thereof requires the use of more aluminum chloride and calcium carbonate than if these organic acids and salts were not present. The additional amounts of the last mentioned reagents required is not merely the added amounts required to neutralize the acidity of the organic acids and salts thereof, but far exceeds these amounts. Apparently the organic acids and salts thereof, even when neutralized, tend to solubilize the pectin or the aluminum hydroxide. We therefore remove citric acid from the original fruit material by washing with water to such an extent that the extract obtained from the fruit material will contain not more than 0.2% of citric acid by weight of the extract or, preferably, not more than 0.1% of citric acid.

The preferred low citric acid content can be effected by washing one part, by weight, of the peel or other fruit material with at least 8 parts of cold water while simultaneously or previously grinding the peel to relatively small particle size. After such combined grinding and washing, an extraction will yield a pectin extract containing between 0.50 and 0.75% of pure pectin, depending upon the type of citrus fruit processed.

Besides citric acid, estimated at about 0.10% on the basis of a titration with sodium hydroxide to a pH of 7.00, the extract also contains calcium citrate and potassium citrate. We have not determined the exact percentages of these salts present, but surmise that for each 11 parts by weight of citric acid there is present the equivalent of 1 part of sodium citrate. This estimate is based on the results obtained from the following experiment:

A 6% citric acid solution has a pH of 1.90. Lemon juice containing the same amount of citric acid has a pH value of from 2.30 to 2.60. Calcium and/or potassium citrate present in the juice apparently buffer the juice to raise the pH value to 2.30 to 2.60. When 0.525 grams of sodium citrate are added to 100 ml. of a 6% solution of citric acid, the pH is raised from 1.90 to 2.50. The ratio of citric acid to sodium citrate is about 11.2/1.

The importance of complete washing is illustrated by the following experiment:

One gallon of a commercial pectin extract containing 3.8 grams of citric acid (0.1%) and 0.34 grams added sodium citrate requires 11 grams calcium carbonate and 100 ml. of a 25% (by weight) $AlCl_3.6H_2O$ solution for complete precipitation of the pectin. One gallon of commercial pectin extract containing 7.6 grams citric acid and 0.68 grams added sodium citrate requires for complete precipitation 20 grams calcium carbonate and 200 ml. of the above specified aluminum chloride solution. The coprecipitation of pectin with aluminum hydroxide in the absence of those amounts of organic acids and their salts normally present when pectin is conventionally coprecipitated with aluminum hydroxide, reduces sharply the amount of aluminum hydroxide required for coprecipitation.

It is therefore an important object of the present invention to provide a process for isolating pectin from fruit pulp and the like, involving the precipitation of pectin from solution with aluminum hydroxide and devoid of the disadvantages referred to hereinabove as concomitant to the conventional coprecipitation of pectin with aluminum hydroxide.

A more specific object of this invention is to provide a method of the nature indicated involving an initial washing of the fruit pulp or other starting material for removing organic acids and salts thereof.

Another object of this invention is to provide a method of the nature indicated involving an initial washing of the fruit pulp or other starting material for removing organic acids and salts thereof, followed by coprecipitation of the pectin with aluminum hydroxide.

A further object of the present invention is to provide a method for extracting pectin from fruit pulp or the like including, as an initial step, washing out organic acids and metal salts thereof followed by extraction with an aqueous medium acidified with hydrochloric acid or the like, and the precipitation of the extracted pectin by aluminum hydroxide formed in a reaction between calcium carbonate and a soluble aluminum salt.

A further object of the invention is to provide a method of precipitating pectin from an aqueous medium so as to produce a porous precipitate that filters readily and that may be washed immediately after precipitation with acidified alcohol without any intermediate grinding.

Other and further objects and features of the present invention will become apparent from the following description of methods embodying features of this invention and from the appended claims.

In proceeding according to the present invention, fruit material such as orange, lime, or lemon peel or other vegetable matter is first ground, then washed with an aqueous medium to free the pectin-containing material from hydroxy substituted organic acids and salts thereof. Lemon, lime or orange peel may suitably be ground in a swing hammer mill to particle sizes of the order of corn meal. More suitably, the citrus fruit is first reamed to remove the pulp sacs and the juice, and then squeezed to remove the essential oils as well as any pulp material remaining after the reaming treatment. Hot water previously used in a washing or rinsing step described hereinbelow may be added in the mill (about 30,000 gallons for each 30 tons of pulp) and there intimately mixed with the peel. The resulting mixture may be passed through a finely screened reel, from which the water may be drained away and discarded, the washed peel being dropped into an additional amount of fresh hot water. This fresh hot water may be mixed thoroughly with the peel, for instance, in an agitator tank from which the aqueous mixture is pumped through another revolving screen. In this screen, the peel may be drained free of liquid and may be rinsed in the reel to remove water-soluble matter more completely. The hot water originally added to the fruit pulp in the agitator tank and that used to rinse the peel in the second reel may be returned to the hammer mill for initial washing of further amounts of ground pulp, as described hereinabove. If desired, cold water may be employed as a washing medium.

The initial step of the method of the present invention thus involves comminution or disintegration of the fruit or other vegetable pectin-containing starting material, coupled with a washing of the starting material with a substantially neutral aqueous medium to remove organic acid ions. Such a washing in a neutral medium will not remove appreciable amounts of pectous material and, if the washing is properly carried out, the extract of the washed pulp will contain not more than 0.1% of citric acid.

The comminuted or disintegrated and washed fruit pulp or other starting material is treated at an elevated temperature with an acidified aqueous medium to extract pectin. The aqueous extraction medium should be acidified with an inorganic acid that does not form an insoluble salt with calcium, in view of the subsequent treatment of the extract with calcium carbonate. Hydrochloric acid is the preferred acidifying agent, since hydrochloric acid will react with calcium carbonate added subsequently to form calcium chloride, which may aid in the formation of a precipitate that is easily filtered off. The washed lemon, lime or orange peel is therefore preferably treated in one or more tanks with fresh water acidified with hydrochloric acid. Enough hydrochloric acid is added to effect a pH in the water-fruit pulp mixture ranging from about 2.00 to about 2.50. This pH range is preferred, since at a pH below 2.00 pectin is modified chemically, the viscosity of solutions of pectin subjected to pH conditions below 2.00 being increased to such an extent that filtration is hampered. At a pH above 2.50, the extraction of pectin is less complete. The preferred pH range is from 2.40 to 2.50. The amount of water added to the pulp is controlled so that after completed extraction the resulting pectous liquor can be separated from the residual pulp by means of diatomaceous earth.

When the proper amount of peel, acid and water has been added to a cook tank, steam is turned on and the temperature is raised to approximately 170° F. To effect complete extraction of pectin from the pulp, the pulp-water mixture usually is cooked from 45 minutes to 75 minutes at 170° F. The cooking is then interrupted, and calcium carbonate in water suspension is added to raise the pH to 3.00 or higher. We have found that at high temperatures such as 170° F., a pH of 3.00 is most desirable, although other pH values may be used without harmful effects. For instance, at a pH of 3.00, the pectin is not chemically modified to any substantial extent and the pectous extract will not attack and deteriorate ordinary filter cloths, if such should be used in any subsequent filtering steps.

The residual fruit pulp is then separated from the pectous extract. Such separation may suitably be effected by adding diatomaceous earth to the cooked pulp-extract mixture and mixing the diatomaceous earth thoroughly with the cooked material. Filtration may then be effected by pumping the whole mixture into a screw press, such as the Leo press, or into a filter press.

If desired, the filtration following the extraction with an acidified aqueous medium may be omitted; a screening step being substituted for the purpose of removing seeds and other relatively large undigested particles. The finely divided fibrous matter will then be carried over into the finished pectin. However, the presence of finely divided fibrous matter in pectin is not always objectionable.

As a result of the extraction of the pectin-containing starting material with an acid aqueous medium at an elevated temperature followed by the addition of chalk and by a separation of the extract from the residual pulp, there is obtained an aqueous pectin solution having a pH value of at least 3.00, which is not too concentrated for further treatment according to the present invention.

At this stage of our process we have obtained a pectous extract free from pulp and having a pH of 3.00 or higher and containing considerable amounts of calcium chloride but substantially no alkali metal salts and not more than 0.1% citric acid or other hydroxy substituted organic acid. This extract is next treated to effect a coprecipitation of its pectin content with aluminum hydroxide.

We have discovered that when the pectous extract wherein aluminum hydroxide formation is to be effected is devoid of hydroxy substituted organic acids and salts thereof, maximum pectin precipitation can be effected with amounts of aluminum hydroxide smaller than those necessary in the presence of hydroxy substituted organic acids and salts thereof. Amounts of calcium carbonate and aluminum chloride can therefore be used that are much smaller than those corresponding to the amount of ammonia or sodium carbonate and aluminum sulfate used in conventional pectin precipitation processes involving coprecipitation with aluminum hydroxide. We also believe that the calcium chloride formed when aluminum hydroxide is precipitated by the reaction of aluminum chloride with calcium carbonate is effective to harden the resulting precipitate to such an extent that it is unnecessary to wash the curd with fresh water before pressing the same. Any ferric or ferrous chloride present as a contaminant in the aluminum chloride aids in such hardening. In place of calcium carbonate there may be substituted other salts, which are devoid of hydroxy substituted organic acids, such as magnesium carbonate, although then the curd obtained may not be so hard and easily separated as when calcium carbonate is used and the magnesium chloride formed is not removed by subsequent washing with alcohol.

As indicated hereinabove, magnesium hydroxide or magnesium carbonate may be substituted for calcium carbonate when aluminum chloride is used. However, when aluminum sulfate is used, magnesium carbonate does not react satisfactorily in the presence of citric acid present to the extent of 0.05% or more in the extract. At that concentration of citric acid, a satisfactory precipitate cannot be obtained even when as much as five times the amount of precipitating agents are used (compared to when aluminum chloride and calcium carbonate are used). We therefore prefer to use calcium carbonate.

In the above-described coprecipitation of pectin with aluminum hydroxide, aluminum chloride contaminated with ferric or ferrous chloride may be used with entire satisfaction. Iron chloride, as well as iron hydroxide, is quite soluble in acidified alcohol and can consequently be removed completely from the pectin by subsequent washing with acidified alcohol. Aluminum sulfate is preferably not used as a source of aluminum hydroxide, since aluminum sulfate would introduce sulfate ions into the pectous extract, which would form a precipitate with the calcium ions in the extract derived from the addition of calcium ions in the extract derived from the addition of calcium carbonate.

If, for the purpose of precipitating pectin, the pectous extract having a pH of 3.0 is cooled to room temperature and then treated with further amounts of calcium carbonate to effect a pH ranging preferably from 6.00 to 6.80 (after removal of liberated $CO_2$, as by heating) and an aqueous solution of aluminum chloride is next added to effect a pH ranging preferably from 3.70 to 4.50, the thus treated pectous extract turns into a jelly-like mass, which upon further agitation breaks up and shrinks to form a firm, easily pressed out curd. In other words, precipitation at room temperature with calcium carbonate and aluminum chloride effects the formation of a precipitate that is eminently suitable for filtration.

When pectin is coprecipitated with aluminum hydroxide by conventional methods involving exposing the pectin to relatively high pH conditions due to sodium carbonate, sodium hydroxide, or ammonia, the pectin is adversely affected. The deleterious effect is greater at high temperatures. For this reason, conventional practice has been to avoid, whenever possible pH conditions above 4.50 and, in particular, above 7.00, especially when the pectin is simultaneously exposed to high temperatures. We have now found that when pH values as high as 6.80 or even 7.00 are brought about by the addition of calcium carbonate or the like, the pectin is not destroyed or otherwise affected, even at initial temperatures as high as 180° F. for periods of time as long as twenty-four hours.

We have found it possible, without injury to the pectin, to prepare a pectin-aluminum hydroxide coprecipitate of a porous nature that after filtration can immediately be washed with alcohol, by precipitation with chalk and aluminum chloride carried out at an elevated temperature, preferably at 120° to 180° F. The coprecipitate so obtained may be boiled for short periods of time.

More color is also removed from the pectin by precipitation at relatively high temperatures so that the pectin obtained is more white and colorless. Precipitation is also more complete, as indicated by the mother liquor viscosity of 29 seconds (measured as disclosed hereinbelow). Hence precipitation with chalk and aluminum chloride is preferably carried out at 120° to 180° F. Most suitably, we use the hot filtrate obtained in the separation of pulp from the pectous extract obtained with an acid aqueous medium.

Best results are usually obtained by adding to one gallon of hot pectin extract 11 grams of precipitated chalk in water suspension, stirring the resulting mixture until the pH is constant (the time required depends upon the size of the chalk particles added and will usually amount to a few minutes), and then adding 100 ml. of an aqueous aluminum chloride solution (25% by weight), which is quickly stirred in so that the mass jells almost immediately. Whether or not the precipitation of pectin is complete can be determined by a viscosity test on the mother liquor, as disclosed hereinbelow. If necessary for complete precipitation, more calcium carbonate or aluminum chloride may be added without bringing the pH values outside the range of 3.70 to 4.50. In any case, at least the minimum amounts of precipitating agents required for pure pectin solutions should have been added. These minimum amounts are indicated hereinbelow.

After precipitation has been effected by the addition of aluminum chloride, the reaction mass is stirred for a short period of time, during which the precipitate will rise to the top. The mother liquor on the bottom may then be drained away, and the wet precipitate may be pumped to suitable means for separating the precipitated curd. Very satisfactory separation may be effected in a reel or cylindrical revolving screen.

If desired, precipitation may be carried out at temperatures as low as 120° or 130° F., and the precipitate, along with the mother liquor, then heated, say, to 180° F. We have noted, however, that the introduction of live steam into the mixture of precipitate and mother liquor, at temperatures above 180° F., tends to reduce the yield of pectin, although not affecting the grade or jellying properties of the pectin. This loss in yield is thought to be due to a mechanical tearing up of the precipitate by the steam. If a similar precipitation is carried out at 130° F. in the laboratory in a vessel heated by a direct flame, the precipitate may be boiled for five minutes without loss in yield or jelly grade. A precipitate obtained at 130° F. weighing 100 grams (when screened) will have its weight reduced to 75 grams (when screened) by being boiled for five minutes in its mother liquor. This loss in weight is due solely to a reduction in the amount of water absorbed by the precipitate.

If desired, the aluminum chloride solution may be added to the pectous extract ahead of the calcium carbonate. Such a reversal of the order of addition yields a precipitate that is separated even more easily. However, this reversal of steps involves the disadvantages of effecting the precipitation of about ten per cent less pectin. The initial addition of calcium carbonate followed by the addition of aluminum chloride is preferable as effecting a better yield.

If pectin precipitated at 130° F. is separated from its mother liquor by means of a Leo press, filter press, or the like, the resulting cake usually contains for each three pounds of pectin (dry base) about twenty pounds water and other non-pectous matter, including aluminum and iron hydroxides. If precipitated or heated to 180° F., the press cake may contain, for each three pounds of pectin, as little as ten pounds water and other non-pectous matter.

If precipitation is carried out at 180° F., and if the precipitate is reeled or otherwise screened, the resulting mass will contain about 25 pounds of water and other non-pectous matter for each pound of pectin (275 grade).

It is necessary to remove the water and other non-pectous matter, while at the same time it is desirable to confer on the finished pectin a pH value of about 3.00. Treatment for this purpose suitably includes washing in an acidified alcoholic medium for the purpose of dissolving out from the precipitate aluminum and eventual iron hydroxides while not extracting the pectin content of the precipitate. This washing with acidified alcohol is carried out until the ash content of the curd has been reduced to 1.5%. The choice of this second point will become evident from data disclosed hereinbelow. Additional steps may include washing with alcohol and washing with alcohol containing a buffer salt, preferably sodium lactate, in an amount such as to restore to the pectin a pH value of 3.00. At this point the pectin is pressed free of alcohol, dried and ground. After standardizing the jelly strength of the pectin by the well-known H. T. Leo method, the pectin is ready for the market.

The effect of washing the precipitated pectin with 45% alcohol containing various amounts of hydrochloric acid and hence having various pH values is illustrated by the following table:

| Exp. No. | pH of Alcohol | Per Cent Ash Content of Curd After Washing | Per Cent Sodium Citrate Required to Disperse the Pectin Completely |
|---|---|---|---|
| 1 | 1.00 | 1.50 | None. |
| 2 | 1.50 | 1.91 | 2. |
| 3 | 2.00 | 2.50 | 10. |
| 4 | 2.50 | 2.80 | 15. |
| 5 | 3.00 | 4.54 | 20. |
| 6 | (¹) | 12.35 | More than 45. |

¹ No acid used.

The test for complete dispersion is conformance with the pectin grade test to be expected from the pectin being used.

In the case of pectin that has been separated from its mother liquor by a pressing method, the water and aluminum hydroxide content of the pressed but still wet curd is most suitably removed by treatment including two successive washings with acidified aqueous alcohol at a pH of 1.0 or less followed by a number of rinsings with high strength alcohol, and finally by a rinsing with high strength alcohol containing sodium lactate in solution. The acidified alcohol used in the second washing, as well as the alcohol used in the subsequent rinsings, may be collected for reuse in the first washing with acidified alcohol of an additional batch of pectin.

The removal of aluminum hydroxide and water from the pressed precipitate may suitably be initiated by breaking up or shredding the pressed cake to return the pectin to the form in which it was precipitated. To the broken up or shredded curd there is added approximately 75% acidified alcohol derived from the second washing of a previous batch, together with from 85% to 87% alcohol derived from four or more rinses of the previous batch of pectin. A sufficient amount of the acidified 75% alcohol having a pH of approximately 1.50 is added to bring the final alcohol content of the pectin-alcohol mixture to about 45%. This mixture should preferably have a pH of about 0.8 to 1.00. The entire mixture may then be pumped to a shallow tank having a false bottom in which the acidified alcohol can drain away freely. Then 85% alcohol acidified with a hydrochloric acid to a pH of 0.80 to 1.00 is added in amount sufficient to just cover the pectin, and allowed to stand with the pectin for from 15 to 20 minutes. No agitation is necessary, although pumping of alcohol from under the false bottom and discharging of the pumped alcohol over the top of the mixture is desirable. This acidified alcohol is then allowed to drain away and collected for use with the subsequent rinsing alcohol in the first treatment with acidified alcohol of a subsequent pectin batch.

Fresh 85% alcohol is then added in amount sufficient barely to cover the pectin and allowed to remain 15 or 20 minutes. The alcohol is then drained away. The number of such alcohol rinses required can be determined by the pH of the discarded alcohol. When the pH of the alcohol used for rinsing reaches 2.00 to 2.30 (usually after four rinsings), a solution of a buffer salt, such as sodium acetate or citrate or, preferably, sodium lactate, is added to the final rinsing alcohol to bring the pH close to 3.00. After this pH has been reached, the pectin may be introduced into a hydraulic press for removal of alcohol. The resultant cake is disintegrated and dried in vacuo.

In the washing treatment of precipitated pectin separated from its mother liquor by reeling and consequently containing a relatively large amount of water, care should be taken in the initial washing step that the acidified alcohol does not have a pH below 2.00, as otherwise the precipitated pectin tends to gelatinize or redissolve partially, whereby its porous nature is destroyed and subsequent complete washing rendered difficult. In general, the first rinsing step should form a mixture containing at least 20% alcohol.

If desired, the precipitated pectin may be dried after the initial rinsing with acidified alcohol, without any loss of jelly strength. However, such drying is not at all necessary.

More specifically, seven gallons of 0.5 to 1.75% pectin extract will yield approximately 180 grams of 250 grade, or one pound (454 grams) of 100 grade pectin. When treated as described hereinabove to precipitate this pectin at an elevated temperature by means of calcium carbonate and aluminum chloride, the precipitated pectin being separated by reeling, there is formed about 4500 grams of drained, porous, granular pectin material containing about 90 to 95% water and approximately 5 to 10% total solids, including pectin and alumina. To this 4500 grams of porous, granular wet pectin is added 1½ gallons (5677 ml.) of previously used rinsing alcohol having a pH of not less than 2.00. After the wet pectin has been soaked for about 20 minutes, the pH will be found to be about 3.00 to 3.50. This alcohol is drained off, and after having been drained off will test about 45%. Draining off of the alcohol is suitably effected by means of a finely screened reel, the alcohol being returned to a still for recovery.

The once-washed pectin is dropped into one gallon (3785 ml.) of used alcohol containing sufficient HCl to bring the pH to 0.7 to 3.00, depending upon how thoroughly the alumina is to be removed. We find that a pH produced with HCl ranging from 0.7 to 1.00 will remove practically all the alumina, so that the final pectin is completely soluble in pure water when a pH is effected in said pectin of about 3.00, either by alcohol washing to this pH, or by neutralizing with a buffer salt after washing to a pH value of 2.50 with alcohol.

Neutralization after washing to a pH of less than 2.50 is not suitable, since such neutralizing precipitates some alumina in the pectin, making the pectin partially insoluble in water, unless an acid or a peptizing salt is added, such as sodium citrate or potassium tartrate. For instance, if only enough acid is used in the rinsing to give a pH of 2.00 and several rinsings are carried out at this pH value, followed by a final neutralization to a pH of 3.00, the resulting pectin will not be soluble in pure water at a pH of 3.00, but must have an acid or a peptizing salt added to dissolve residual alumina. However, if an acid or a peptizing salt is added to effect a pH higher than the pH of set of said pectin at 218° F., a perfectly satisfactory jelly can be made without any danger of jelling in the kettle.

Satisfactory results are obtained if after the initial rinsing with alcohol having a pH of at least 2.00 a further rinsing is carried out at a pH of approximately 0.7 to 1.0. The pectin is treated for, say, 20 minutes in this acid alcohol bath and then pumped to a tank with a false bottom covered with cloth fine enough to avoid pectin losses. In this tank, after draining away of the acid alcohol, the final rinses are carried out by circulating high proof alcohol in several stages. By this method the pH value of pectin is raised to the desired point before neutralization, testing and drying.

Since the addition of high proof alcohol to a pectin containing a lower per cent of alcohol has a tendency to shrink the pectin, washing in a filter press is not practical, because channeling takes place through the cracks developed. In an open tank the wet material can be raked to smooth over the cracks and thus avoid channeling. For washing in a filter press, successive batches of alcohol used must have the same strength, to avoid shrinking. This is the reason why we prefer to use the above described false bottom tank.

After the pectin has been washed repeatedly with high proof alcohol, it is desirable to press out most of the remaining alcohol before drying, but this is not essential, since the proof of the alcohol is very high and very little water is left. The successive additions of high proof alcohol dehydrate the pectin.

The washing treatment of reeled (not pressed) precipitated pectin can be briefly summarized as follows:

I. Washing with preferably about 75% alcohol (ethyl or isopropyl) having a pH of not less than 2.00. The total amount of alcohol in the pectin-water-alcohol mixture should amount at least to 20%.

II. Washing with, say, 75% alcohol having a pH below 1.00.

III. Washing with strong (about 85 to 95%) alcohol repeated as required to raise the pH value up to 2.50.

IV. Washing with strong (about 85 to 95%) alcohol containing sodium lactate to raise the pH value at least to 3.00.

If desired, the pectin can be dried before steps I or II. The above disclosed method of preparing pectin is clarified by a series of experiments which we have carried out on pure pectin. These experiments show clearly the effect on the coprecipitation of pectin with aluminum hydroxide of various agents. In our experiments we used one gallon lots of a pure pectin solution, made up by dissolving 5 ounces of 200 grade pectin in 4 gallons of distilled water. The resulting solution contains about 0.76% pure pectin, which is approximately equal to the maximum concentration obtained by commercial extraction of citrus fruit material. This standard solution is quite pure, containing only very small amounts of impurities, which are principally metal compounds. The standard solution is further characterized by a pH value of 3.25 and a viscosity of 46 seconds when measured in a standard 20 c. c. pipette at 70° F.

As explained in greater detail hereinabove, we have found that greatly improved results are obtained by coprecipitating pectin from aqueous solutions by means of aluminum chloride and calcium carbonate. The amount of aluminum chloride and calcium carbonate required to effect complete precipitation of pectin from the above described pure pectin solution has been determined as follows. The viscosity of water at 70° F., when measured with a standard 20 c. c. pipette in our possession, is 29 seconds. A coprecipitation of aluminum and hydroxide from the above mentioned standard pectin solution effecting a viscosity of 29 seconds in the mother liquor may be considered as having effected a complete removal of the pectin.

We have found that best results are obtained by first adding to the pectin solution an amount of calcium carbonate sufficient to raise the pH value to from 6.00 to 6.80 (after removal of liberated $CO_2$) and thereafter incorporating with the pectin solution an amount of aluminum chloride sufficient to lower the pH value to from 3.70 to 4.50. If the viscosity of the mother liquor is more than one second above that of water, we adjust the pH with calcium carbonate or with aluminum chloride to a higher or lower pH value falling somewhere between the range of 3.70 to 4.50, until the desired viscosity is effected in the mother liquor. To precipitate all the pectin from one gallon of the standard pure pectin solution we have found that a minimum of 2.8 grams calcium carbonate (effecting a pH of 6.20 after removal of $CO_2$) and of 20 c. c. of a 25% (by weight) $AlCl_3.6H_2O$ solution (effecting a pH of 4.30) was required. Some pectin is precipitated if amounts of calcium carbonate and aluminum chloride falling below these minima are used, but precipitation is not complete, as indicated by the fact that the mother liquor has a viscosity in excess of 29 seconds. Satisfactory precipitation can be effected by the use of more than the minimal amounts of aluminum chloride and calcium carbonate. For instance, satisfactory precipitation can be obtained by incorporating with one gallon of pectin solution 6.4 grams calcium carbonate effecting a pH of 6.70 (after removal of $CO_2$) and 80 c. c. of the above specified aluminum chloride solution effecting a pH of 4.35. The precipitates obtained in the above described experiments were quite satisfactory for pressing.

The presence of hydrochloric acid in the standard pectin solution does not interfere with the coprecipitation of pectin so long as sufficient additional amounts of calcium carbonate are added to neutralize the hydrochloric acid. After the addition of three one gallon batches of standard pectin solution of, respectively, 1.92 grams, 3.84 and 9.60 grams of hydrochloric acid followed by the addition of, respectively, 5.4 grams, 8.0 grams and 15.6 grams of calcium carbonate effecting pH values, respectively, of 6.10, 6.50 and 6.50 (after removal of $CO_2$), the addition, in each case, of 20 c. c. of the above specified aluminum chloride solution suffices to effect pH values of 4.30 to 4.35 with complete precipitation of all the pectin in the form of firm curds suitable for filtration.

We have further found that the coprecipitation of pectin from aqueous solutions with aluminum hydroxide is greatly affected by the presence or absence of organic acids and their salts in said aqueous pectin solution. The effect of hydroxy substituted organic acids and their salts is of particular interest, since such acids and salts are naturally present in many fruits and other vegetable material from which pectin is commercially extracted.

When, for instance, citric acid is added to a standard pectin solution described hereinabove, the coprecipitation of the pectin with aluminum hydroxide is affected profoundly. If to one gallon of pectin solution 3.8 grams of citric acid are added (0.1% citric acid), giving a pH value of 3.05, no precipitate is obtained by subsequently adding 5.6 grams calcium carbonate (2.8 grams sufficient in the absence of citric acid plus 3.8 grams required to neutralize the citric acid and to give a pH value of 5.90) followed by the addition of 20 c. c. of the specified aluminum chloride solution giving a pH value of 4.60. When 3.8 grams citric acid (0.1%) has been added to one gallon of pectin solution, we find it necessary to add 8 grams calcium carbonate effecting a pH value of 6.20 and 52 c. c. of the specified aluminum chloride solution effecting a pH value of 4.30 in order to precipitate the pectin completely in satisfactorily firm condition. In other words, in the presence of 0.1% citric acid, complete pectin precipitation requires more than two and a half times as much calcium carbonate and more than two and a half times as much aluminum chloride solution as in the absence of the citric acid. It may be necessary to adjust the final pH value within the range of 3.70 to 4.50, if the final viscosity of the mother liquor is not satisfactory. For instance, if precipitation from a pectin solution containing 0.1% citric acid is attempted with 6.92 grams calcium carbonate effecting a pH of 6.30 and 43 cc. of aluminum chloride solution effecting a pH of 4.25, the mother liquor will have a viscosity of 40 seconds, which indicates incomplete precipitation. The curds obtained are also too soft for immediate filtration.

The effect of the addition of 7.6 grams (0.2%) of citric acid giving a pH of 2.90 is illustrated by the following experiments. No precipitation occurs on the addition of 8 grams calcium carbonate giving a pH value of 5.30 followed by the addition of 52 c. c. aluminum chloride solution giving a pH value of 3.32. No precipitation occurs on the addition of 11.20 grams calcium carbonate giving a pH value of 5.90 followed by the addition of 62 c. c. of aluminum chloride solution giving a pH of 4.25. A complete precipitation of the pectin in the form of firm curds is effected by the addition of 14.40 grams calcium carbonate giving a pH value of 6.30 followed by the addition of 100 c. c. aluminum chloride solution giving a pH value of 4.30.

The presence of alkali metal salts of organic acids in the standard pectin solution has a similar effect. The addition of 4 grams of sodium citrate giving a pH value of 4.20 prevents any precipitation at all on the addition of 2.8 grams of calcium carbonate giving a pH value of 6.50 followed by an addition of 20 c. c. of the above specified aluminum chloride solution giving a pH value of 4.20. After the addition of 8 grams of sodium citrate effecting a pH value of 5.0, the addition of 5.4 grams of calcium carbonate effecting a pH value of 7.05 followed by an addition of 60 c. c. of the above specified aluminum chloride solution effecting a pH value of 4.25 effected only an incomplete precipitation of pectin in the form of soft curds.

The presence of iron chloride in the aluminum chloride is not deleterious. Aluminum sulfate is preferably not used in place of aluminum chloride, since the aluminum sulfate will cause a precipitation of calcium sulfate due to reaction with calcium chloride derived from the calcium carbonate used to raise the pH of the pectin solution to 6.00 to 6.80.

Magnesium carbonate or magnesium hydroxide may be used in place of calcium carbonate in conjunction with either aluminum chloride or aluminum sulfate. Complete precipitation of pectin from one pint of the standard solution can be effected by adding 6 grams of 7% milk of magnesia to effect a pH of 8.50 followed by addition of 5 c. c. of a 25% solution of

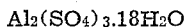

$$Al_2(SO_4)_3 \cdot 18H_2O$$

lowering the pH value to 4.12. A firm precipitate is obtained, and the mother liquor has a viscosity of 30 seconds. Even better results are obtained by adding to one pint of the standard pectin solution 0.7 gram precipitated magnesium carbonate raising the pH value to 7.80 and finally adding 7 c. c. of 25% by weight

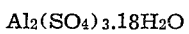

$$Al_2(SO_4)_3 \cdot 18H_2O$$

lowering the pH to 4.10. The mother liquor has a viscosity of 29 seconds.

Magnesium salts can be used with both aluminum chloride and aluminum sulfate, since magnesium chloride and magnesium sulfate are both soluble in water. However, magnesium sulfate is not soluble in alcohol to any extent while magnesium chloride, although soluble in alcohol, is less soluble than calcium chloride. For this reason calcium carbonate and aluminum chloride are the preferred precipitating agents.

It will thus be seen that we have provided a simple and convenient method of extracting high grade pectin having any desired jelling properties with exceptionally high yield from pectous vegetable material, in particular, citrus fruit material. Many details in procedure may be varied within a wide range without sacrificing the above disclosed advantages and without departing from the principles of this invention, and it is therefore not our purpose to limit the scope of the patent granted on this invention otherwise than necessitated by the scope of the appended claims.

In the specification and in the following claims, the pH values of from 6.00 to 6.80 recited as effected by the addition of calcium carbonate or the like should be understood as signifying a pH value measured after removal of liberated carbon dioxide, as by heating, for if the pH value is measured with the liberated carbon dioxide present, values of from 5.7 to 6.1 will be obtained whereas higher pH values will be obtained when measurements of pH are made after removal of carbon dioxide.

It should be understood, however, that in the actual carrying out of our process, it is not necessary to remove the liberated carbon dioxide. Such removal is done only in the samples taken from the batch of material being treated, so that accurate pH measurements can be made in the samples. The pH values determined in the samples after removal of liberated carbon dioxide afford a correct indication of the amount of calcium carbonate to be added (which should effect a pH of 6.0 to 6.8 after removal of $CO_2$). To be sure, the liberated carbon dioxide is in many instances removed from the main batch, as when the batch is heated to 180° F. with steam, and then the pH values as determined in the sample (after removal of $CO_2$) and in the batch are the same. Nevertheless, the pH values in the batch and in the samples (after removal of $CO_2$) are not necessarily identical.

This application is a continuation-in-part of our prior application of the same title Serial No. 509,794, filed November 10, 1943.

We claim as our invention:

1. A method of preparing pectin from citrus fruit material which comprises comminuting said fruit material and subjecting said fruit material to the action of an approximately neutral aqueous medium to extract hydroxy substituted organic acids and soluble salts thereof from said fruit material to an extent such that a subsequent extraction of the washed fruit material will yield a pectin extract containing not more than 0.2% citric acid, separating the thus treated pulp from the aqueous medium, subjecting the separated pulp to the action of an aqueous medium acidified with an acid forming a soluble calcium salt and having a pH ranging from 2.00 to 2.50 for from about 45 minutes to about 75 minutes at about 120 to 180° F., separating the resulting extract from the residual pulp, incorporating an amount of calcium carbonate with the separated extract sufficient to effect in the extract a pH of from 6.00 to 6.80 after removal of liberated carbon dioxide, incorporating with the thus treated extract aluminum chloride in an amount sufficient to effect a pH value of from 3.70 to 4.50 in the extract, separating by screening from the extract a coprecipitate of pectin and aluminum hydroxide formed after the incorporation of said aluminum chloride, treating the wet separated unground coprecipitated pectin and aluminum hydroxide with acidified aqueous alcohol having a pH numerically at least equal to 2.00, the amount of said alcohol being such that the mixture of pectin, aluminum hydroxide, water and alcohol contains at least 20% alcohol, separating said acidified alcohol from the pectin, thereafter treating said pectin with acidified aqueous alcohol having a pH value between 0.7 and 1.0, separating the thus treated pectin from said acidified aqueous alcohol having a pH of from 0.7 to 1.0, thereafter repeatedly washing the thus treated pectin with alcohol to raise the pH value of the pectin at least to 2.50, and thereafter washing the thus treated pectin with an alcohol solution of sodium lactate to effect in the pectin a pH value numerically at least equal to 3.00.

2. A method of preparing pectin from citrus fruit material which comprises comminuting said fruit material and subjecting each part of said fruit material to the action of at least eight parts, by weight, of an approximately neutral aqueous medium to extract hydroxy substituted organic acid-containing matter therefrom to an extent such that a subsequent extraction of the washed pulp will yield a pectin extract containing not more than 0.1% citric acid, separating the thus treated pulp from the aqueous medium, subjecting the separated pulp to the action of an aqueous medium acidified with an acid forming a soluble calcium salt at an elevated temperature to extract pectin therefrom, separating the resulting extract from the residual pulp, incorporating with the separated extract, for each gallon of extract, about 11 grams calcium carbonate and as much aluminum chloride as is contained in 100 ml. of a 25% by weight aluminum hexahydrate solution, whereby a coprecipitation of aluminum hydroxide and pectin is effected, said coprecipitation being effected at a temperature of from 120° to 180° F., separating said precipitate from the mother liquor in which it was formed, and washing the wet separated precipitate with acidified alcohol to remove alumina therefrom.

3. In a method of isolating pectin from an aqueous solution thereof which comprises coprecipitating aluminum hydroxide and pectin, the improvement which comprises effecting said coprecipitation at a temperature of from 120° to 180° F., by the addition of calcium carbonate to effect a pH value of from 6.00 to 6.80 after removal of liberated carbon dioxide and by the subsequent addition of aluminum chloride to effect a pH value ranging from 3.70 to 4.50.

4. In a method of isolating pectin from an aqueous solution thereof which comprises coprecipitating aluminum hydroxide and pectin, the improvement which comprises effecting said coprecipitation at a temperature of from 120° to 180° F. by the initial addition of calcium carbonate in an amount such as to effect a pH value of from 6.00 to 6.80 after removal of liberated carbon dioxide and by the subsequent addition of aluminum chloride in an amount such as to effect a pH value ranging from 3.70 to 4.50, separating the resulting coprecipitate by screening from the mother liquor, treating the coprecipitate while still wet with acidified aqueous alcohol at a pH value not below 2.00, the mixture of coprecipitate and aqueous alcohol containing at least 20% by weight of alcohol, thereafter separating the thus treated pectin from said acidified alcohol, and washing the separated pectin with acidified aqueous alcohol to remove aluminum hydroxide therefrom.

5. In a method of isolating pectin from pectous vegetable material which comprises extracting hydroxy substituted organic acid-containing matter from said material to an extent where a subsequent extraction with an acid aqueous medium will yield an extract containing not more than 0.2% hydroxy substituted organic acid, extracting pectin from the thus treated material by means of an aqueous medium, acidified with an acid forming a soluble calcium salt, separating the resulting extract from the residual pulp, precipitating aluminum hydroxide in the separated extract by the incorporation therewith of aluminum chloride and of calcium carbonate to form a precipitate containing pectin and aluminum hydroxide, separating the precipitate from the mother liquor in which it was precipitated, and removing the aluminum hydroxide from the pectin with which it was coprecipitated.

6. In a method of isolating pectin from pectous vegetable material including the steps of subjecting said vegetable material to an extraction with an aqueous medium acidified with an acid forming a soluble calcium salt and precipitating aluminum hydroxide in the resulting extract by the incorporation of aluminum chloride and calcium carbonate therewith, the improvement comprising extracting hydroxy substituted organic acid-containing matter from said vegetable material prior to said extraction with an acid aqueous medium to an extent where the said extraction with an acid aqueous medium will yield an extract containing not more than 0.2% hydroxy substituted organic acids.

7. A method of preparing pectin from citrus fruit material which comprises comminuting said fruit material and subjecting said fruit material to the action of an approximately neutral aqueous medium to extract hydroxy substituted organic acid-containing matter therefrom to an extent such that after a subsequent extraction with an aqueous acidified medium the resulting extract will contain not more than 0.2% of citric acid, separating the thus treated pulp from the aqueous medium, subjecting the separated pulp to the action of an aqueous medium acidified with an acid forming a soluble calcium salt at an elevated temperature to extract pectin therefrom, separating the resulting extract from the residual pulp, incorporating calcium carbonate and aluminum chloride with the separated extract at a temperature of from 120° to 180° F. to effect a coprecipitation of aluminum hydroxide and pectin, separating said precipitate from the mother liquor in which it was formed, and washing the separated precipitate with acidified alcohol to remove aluminum hydroxide therefrom.

8. A method of preparing pectin from citrus fruit material which comprises comminuting said fruit material to form a pulp, subjecting said pulp to the action of water to remove hydroxy substituted organic acid-containing matter therefrom to an extent such that on subsequent extraction of said pulp with an acidified aqueous medium the resulting extract will contain not more than 0.2% citric acid, separating the pulp from said water, treating the pulp with water acidified with an acid forming a soluble calcium salt at an elevated temperature to extract pectin from the pulp, separating the residual pulp from the resulting extract, incorporating calcium carbonate and aluminum chloride with the separated extract at a temperature of from 120° to 180° F. to coprecipitate aluminum hydroxide and pectin, separating the precipitate from the mother liquor in which it was precipitated, and subjecting the separated precipitate while still wet and in an unground condition first to the action of acidified alcohol having a pH numerically not below 2.00 and thereafter to the action of acidified alcohol having a pH of between 0.7 and 1.0 to remove aluminum hydroxide from said precipitate.

9. A method of preparing pectin from citrus fruit material which comprises comminuting said fruit material and subjecting the comminuted fruit material to the action of an approximately neutral aqueous medium to extract hydroxy substituted organic acid-containing matter therefrom so that after subsequent extraction of said material with an acidified aqueous medium the resulting extract will contain not more than 0.2% of citric acid, separating the thus treated pulp from the extract, subjecting the separated pulp to the action of an aqueous medium acidified with an acid forming a soluble calcium salt at an elevated temperature to extract pectin therefrom, adjusting the pH of the pulp acidified aqueous medium mixture to a value numerically at least equal to 3.00, incorporating diatomaceous earth with said mixture, filtering said mixture to separate a pectous extract, incorporating calcium carbonate and aluminum chloride with the separated extract at a temperature of from 120° to 180° F. to effect a coprecipitation of aluminum hydroxide and pectin, separating said precipitate from the mother liquor in which it was formed, washing the separated precipitate first with acidified alcohol having a pH value numerically at least equal to 2.00, secondly with acidified alcohol having a pH between 0.7 and 1.0, thirdly with a sufficient amount of alcohol to raise the pH value of said pectin at least to 2.50 by the washing out of hydrogen ions, and fourthly with an alcohol solution of sodium lactate in an amount sufficient to effect a pH value of at least 3.00 in said pectin.

10. In a method of isolating pectin from an aqueous solution thereof which comprises co-precipitating aluminum hydroxide and pectin, the improvement which comprises effecting said coprecipitation at a temperature of at least 120° F. by the addition of calcium carbonate to effect a pH value of from 6.00 to 6.80 after removal of liberated carbon dioxide and by the subsequent addition of aluminum chloride to effect a pH value ranging from 3.70 to 4.50.

11. In a method of isolating pectin from an aqueous solution thereof which comprises coprecipitating aluminum hydroxide and pectin, the improvement which comprises effecting said coprecipitation by the addition to said extract of calcium carbonate and of aluminum chloride, the amount of calcium carbonate incorporated with said extract being that sufficient to effect in said extract a pH of from 6.00 to 6.80 after removal of liberated carbon dioxide in the absence of said aluminum chloride, and the amount of aluminum chloride incorporated with said extract being that effecting in said extract a pH of from 3.70 to 4.50 in the presence of said amount of calcium carbonate.

12. A method of preparing pectin from citrus fruit material which comprises comminuting said fruit material to form a pulp, subjecting said pulp to the action of water to remove hydroxy substituted organic acid-containing matter therefrom to an extent such that on subsequent extraction of said pulp with an acidified aqueous medium the resulting extract will contain not more than 0.2% citric acid, separating the pulp from said water, treating the pulp with water acidified with an acid forming a soluble calcium salt at an elevated temperature to extract pectin from the pulp, separating the residual pulp from the resulting extract, incorporating calcium carbonate and aluminum chloride with the separated extract at a temperature of 120° to 180° F. to coprecipitate aluminum hydroxide and pectin, separating the precipitate from the mother liquor in which it was precipitated, and subjecting the separated precipitate to the action of acidified aqueous alcohol to remove aluminum hydroxide from said precipitate to an extent such that not more than 1.5% aluminum hydroxide will remain in said precipitate.

13. In a method of isolating pectin from an aqueous solution thereof which comprises coprecipitating aluminum hydroxide and pectin, the improvement which comprises effecting said coprecipitation by the addition of calcium carbonate and of aluminum chloride, and boiling the resultant mixture of coprecipitate and mother liquor.

14. A method of preparing pectin from citrus fruit material which comprises comminuting said fruit material and subjecting said fruit material to the action of an aqueous medium to extract organic acids and alkali metal salts thereof to an extent such that on subsequent extraction of said comminuted vegetable material with an acid aqueous medium the resulting extract will contain not more than 0.2% of citric acid, subjecting the treated vegetable material to the action of an aqueous medium acidified with an acid forming a soluble calcium salt at an elevated temperature to extract pectin therefrom, separating the resulting extract from the residual pulp, incorporating with the separated extract calcium carbonate in an amount at least sufficient to effect a pH of 6.00 in the extract after removal of liberated carbon dioxide, incorporating with the calcium carbonate containing extract aluminum chloride in amount effecting in said extract a pH of from 3.70 to 4.50, filter pressing the extract to separate a coprecipitate of pectin and aluminum hydroxide formed by the action of said calcium carbonate and said aluminum chloride, breaking up the filter cakes obtained in said filter pressing step, washing the broken up press cakes in wet unground condition with aqueous alcohol having a pH value of no more than 1.5, such washing being continued until the precipitate contains not more than 1.5% alumina, and washing the pectin containing not more than 1.5% alumina with alcohol in an amount sufficient to raise the pH value of said precipitate at least to 2.50.

15. In a method of isolating pectin from an aqueous solution thereof which comprises coprecipitating aluminum hydroxide and pectin, the improvement which comprises effecting said coprecipitation by the addition of calcium carbonate and by the addition of aluminum chloride, said precipitation being carried out at a temperature at least equal to 120° F. and subsequently separating the coprecipitated aluminum hydroxide and pectin from the mother liquor in which it was precipitated and washing the separated coprecipitate in unground condition with acidified alcohol having a pH not higher than 1.50 to an extent such as to reduce the aluminum hydroxide content of the precipitate at least to 1.5%.

16. In a method of isolating pectin from an aqueous solution thereof which comprises coprecipitating aluminum hydroxide and pectin, the improvement which comprises effecting said coprecipitation by the addition to said solution of calcium carbonate and of a soluble aluminum salt, the amount of said aluminum salt being sufficient to yield that amount of aluminum hydroxide required to precipitate said pectin, and the amount of calcium carbonate being that effecting in said solution a pH value of from 3.70 to 4.50 in the presence of said amount of soluble aluminum salt.

17. A method of isolating pectin from pectous vegetable material which comprises extracting organic acids and alkali metal salts thereof from said vegetable material to an extent such that on subsequent extraction of said vegetable material with an aqueous medium acidified only with an inorganic acid forming a soluble calcium salt the resulting extract will contain not more than 0.2% citric acid, extracting pectin from the thus treated vegetable material by means of an aqueous medium acidified only with an inorganic acid forming a soluble calcium salt, separating the resulting extract from the residual pulp, incorporating with the separated extract a soluble salt of aluminum and an agent capable of reacting with said aluminum salt to precipitate aluminum hydroxide whereby coprecipitation of aluminum hydroxide and pectin is effected, separating the precipitate from the mother liquor in which it was precipitated, and removing the aluminum hydroxide from the pectin with which it was coprecipitated.

18. In a method of isolating pectin from pectous vegetable material including the steps of subjecting said vegetable material to an extraction with an aqueous medium acidified only with an inorganic acid forming a soluble calcium salt and precipitating aluminum hydroxide in the resulting extract, the improvement comprising extracting organic acids and alkali salts thereof from said vegetable material prior to said extraction with an acid aqueous medium to an extent such that said extraction with an acid aqueous medium will yield an extract containing not more than 0.2% citric acid.

19. A method of preparing pectin from citrus fruit material which comprises comminuting said fruit material and subjecting said fruit material to the action of an aqueous medium to extract organic acids and alkali metal salts thereof to such an extent that on subsequent extraction of said fruit material with an aqueous medium acidified only with an inorganic acid forming a soluble calcium salt the resulting extract will not contain more than 0.1% citric acid, separating the thus treated pulp from the extract, subjecting the separated pulp at an elevated temperature to the action of an aqueous medium acidified only with an inorganic acid forming a soluble calcium salt to extract pectin therefrom, separating the resulting extract from the residual pulp, incorporating with the separated extract a soluble salt of aluminum and an agent capable of reacting with said aluminum salt to precipitate aluminum hydroxide whereby coprecipitation of aluminum hydroxide and pectin is effected, separating the resulting precipitate from the mother liquor in which it was formed, and washing the separated precipitate with acidified alcohol to remove aluminum hydroxide therefrom.

20. A method of preparing pectin from citrus fruit material which comprises comminuting said fruit material and subjecting said fruit material to the action of an aqueous medium to extract organic acids and alkali metal salts thereof from said fruit material to an extent such that on subsequent extraction of said fruit material with an aqueous medium acidified only with an inorganic acid forming a soluble calcium salt the resulting extract will contain not more than 0.1% citric acid, separating the thus treated pulp from the extract, subjecting the separated pulp at an elevated temperature to the action of an aqueous medium acidified only with an inorganic acid forming a soluble calcium salt to extract pectin therefrom, separating the resulting extract from the residual pulp, incorporating a soluble aluminum salt with the separated extract, incorporating an aluminum hydroxide precipitant effecting a pH value below 6.8 with the separated extract to effect the coprecipitation of aluminum hydroxide and pectin, separating the resulting precipitate from the mother liquor in which it was formed, and washing the separated precipitate with acidified alcohol to remove aluminum hydroxide therefrom, the pH conditions in all the above specified steps being maintained at values not in excess of 6.80.

21. A method of isolating pectin from pectous vegetable material which comprises extracting organic acids and alkali metal salts thereof from said material to an extent such that on subsequent extraction of said material with an aqueous medium acidified only with an inorganic acid forming a soluble calcium salt the resultant extract will contain not more than 0.2% citric acid, extracting pectin from the thus treated vegetable material by means of an aqueous medium acidified only with an inorganic acid forming a soluble calcium salt, separating the resulting extract from the residual pulp, incorporating with the separated extract a soluble salt of aluminum and an agent capable of reacting with said aluminum salt to precipitate aluminum hydroxide whereby coprecipitation of aluminum hydroxide and pectin is effected, separating the coprecipitate from the mother liquor in which it was precipitated, reducing the aluminum hydroxide content of the coprecipitate at least to 1.5% by washing with acidified aqueous alcohol and treating the resulting pectin containing not more than 1.5% alumina with alcohol and sodium lactate solution to raise the pH value of the pectin at least to 3.0.

HERBERT T. LEO.
CLARENCE C. TAYLOR.